United States Patent
Aksela

(10) Patent No.: US 11,895,124 B2
(45) Date of Patent: Feb. 6, 2024

(54) METHOD OF DATA-EFFICIENT THREAT DETECTION IN A COMPUTER NETWORK

(71) Applicant: F-Secure Corporation, Helsinki (FI)

(72) Inventor: Matti Aksela, Helsinki (FI)

(73) Assignee: F-SECURE CORPORATION, Helsinki (FI)

( * ) Notice: Subject to any disclaimer, the term of this patent is extended or adjusted under 35 U.S.C. 154(b) by 305 days.

(21) Appl. No.: 17/029,538

(22) Filed: Sep. 23, 2020

(65) Prior Publication Data

US 2021/0092129 A1    Mar. 25, 2021

(30) Foreign Application Priority Data

Sep. 24, 2019   (GB) ...................................... 1913715

(51) Int. Cl.
  *H04L 9/40* (2022.01)
  *G06N 20/00* (2019.01)

(52) U.S. Cl.
  CPC .............. *H04L 63/14* (2013.01); *G06N 20/00* (2019.01); *H04L 63/0209* (2013.01)

(58) Field of Classification Search
  CPC ...... H04L 63/14; H04L 63/0209; G06N 20/00
  See application file for complete search history.

(56) References Cited

U.S. PATENT DOCUMENTS

| | | | |
|---|---|---|---|
| 9,516,053 B1 | 12/2016 | Muddu et al. | |
| 10,673,880 B1 * | 6/2020 | Pratt | .................. H04L 63/1433 |
| 2016/0156642 A1 * | 6/2016 | Kouznetsov | .......... G06F 21/552 726/23 |
| 2017/0118240 A1 * | 4/2017 | Devi Reddy | .......... G06N 7/005 |
| 2017/0214702 A1 | 7/2017 | Moscovici et al. | |
| 2018/0367550 A1 | 12/2018 | Musuvathi et al. | |
| 2019/0166144 A1 * | 5/2019 | Mirsky | .................. G06N 20/20 |

FOREIGN PATENT DOCUMENTS

| | | | | |
|---|---|---|---|---|
| EP | 3528462 A1 * | 8/2019 | ........... | G06F 21/554 |
| EP | 3528462 A1 | 8/2019 | | |
| EP | 3742669 A1 * | 11/2020 | ........... | G06K 9/6223 |
| GB | 2569302 | 12/2017 | | |

OTHER PUBLICATIONS

Search Report for GB Application No. 1913715.7 dated Mar. 19, 2020.
European Search Report for Application No. 20197685.9 dated Jan. 15, 2021.

* cited by examiner

*Primary Examiner* — Hee K Song
(74) *Attorney, Agent, or Firm* — Thomas | Horstemeyer, LLP

(57) ABSTRACT

There is provided data-efficient threat detection method in a computer network. The method can include: receiving raw data related to a network node, generating local 5 behaviour models related to the network node; generating at least one common model of normal behaviour on the basis of local behaviour models related to multiple network nodes; filtering input events by using a measure for estimating the likelihood that the input event is produced by the generated common model of normal behaviour and/or by the generated one or more local behaviour models, wherein only input events having a 10 likelihood below a predetermined threshold of being produced by any one of the models are passed through the filtering; and processing input events passed through the filtering for generating a security related decision.

25 Claims, 2 Drawing Sheets

METHOD OF DATA-EFFICIENT THREAT DETECTION IN A COMPUTER NETWORK

CROSS-REFERENCE

This application claims the benefit of and priority to GB Patent Application No. 1913715.7, filed on Sep. 24, 2019, which is herein incorporated by reference in its entirety.

TECHNICAL FIELD

The present invention relates to a highly data-efficient threat detection method and to an apparatus in a computer network.

BACKGROUND

Computer network security systems have become popular. Examples of such are known as Endpoint Detection & Response (EDR) and Managed Detection and Response (MDR) products and services. EDR focuses on the detection and monitoring of a breach as it occurs and after it occurs and helps to determine how best to respond. The growth of efficient and robust EDR solutions has been made possible in part by the emergence of machine learning, big data and cloud computing. MDR in turn is a managed cybersecurity service providing service for threat detection, response and remediation.

EDR or other corresponding systems deploy data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analysed and scanned by the EDR provider for signs of security breaches and anomalies.

A problem with EDR however is that the volume of data produced by the data collectors can be extremely large. Data volume is normally proportional to the activity occurring at a given EDR endpoint so when activity at that EDR endpoint is great, the produced data volume is also great. The immediate consequences of such large volumes of data include decreased quality of service, increased cost of service and increased consumption of resources associated with managing large volumes of data. For example, when high volumes of data need to be processed and made available in a useable format, the associated resource overheads and monetary costs can in some cases be very large for the EDR provider, which in turn can increase the cost of providing EDR to customer organisations. Many organisations thus simply opt not to implement EDR and continue to rely solely on EPP (End Point Protection) solutions, which presents a security risk as they cannot protect the organization against advanced file-less threats.

Some EDR systems have proposed reducing the data overhead by being selective about what data is collected (i.e. a policy of selective data collection limitation). However, this solution is problematic because effective monitoring, detection and forensic analysis often requires as complete a data picture as possible. It is often not possible to know in advance what data will be required to monitor and track a malicious actor. Realising that key pieces of information were not collected can often put a stop to any investigation, rendering such EDR systems ineffective.

There is a need to reduce costs associated with managing large volumes of data and a need to improve the way in which data is collected and processed in the context of EDR systems while at the same time avoiding significant risks to threat detection capabilities. There is also a need to decrease resource consumption and scalability issues that are caused by the continuously increasing data growth.

SUMMARY

According to aspects of the invention there are provided methods of data-efficient threat detection as specified in claims 1, 10 and 14.

According to other aspect of the invention, there is provided an apparatus in a computer network security system as specified in claim 18.

According to other aspect of the invention, there is provided a computer program product comprising a computer storage medium having computer code stored thereon, which when executed on a computer system, causes the system to operate as a server according to the above aspects of the invention.

DETAILED DESCRIPTION

Figure 1:
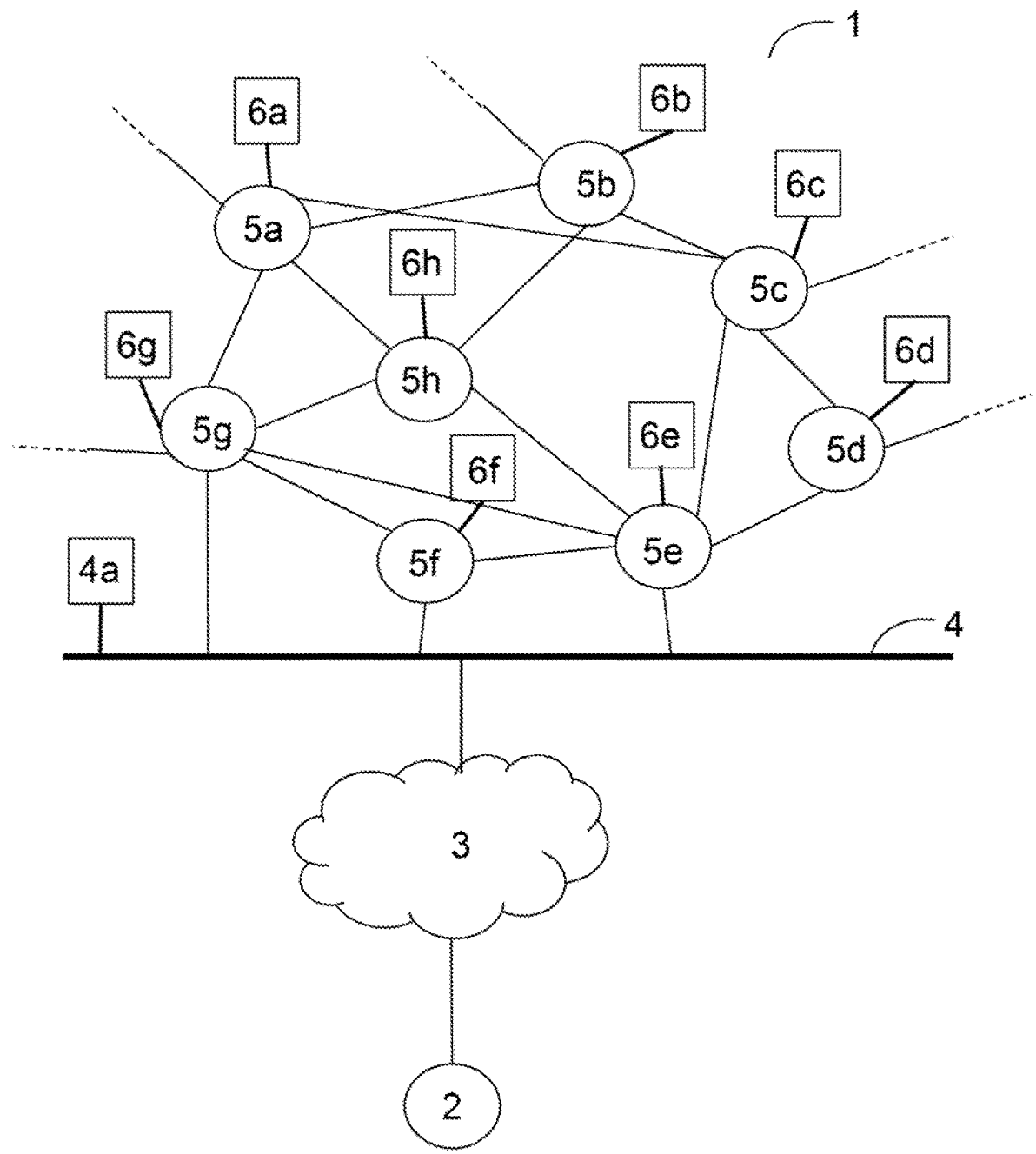
FIG. 1 illustrates schematically a network architecture.

FIG. 1 illustrates schematically a part of a first computer network 1 into which a computer system, for example an EDR system, has been installed. Also, any other computer system that is able to implement the embodiments of the invention can be used instead or in addition to the EDR system used in this example. The first computer network is connected to a security service network, here security backend/server 2 through the cloud 3. The backend/server 2 forms a node on the security service computer network relative to the first computer network. The security service computer network is managed by an EDR system provider and may be separated from the cloud 3 by a gateway or other interface (not shown) or other network elements appropriate for the backend 2. The first computer network 1 may also be separated from the cloud 3 by a gateway 4 or other interface. Other network structures are also envisaged.

The first computer network 1 is formed of a plurality of interconnected nodes 5a-5g, each representing an element in the computer network 1 such as a computer, smartphone, tablet, laptop, or other piece of network enabled hardware. Each network node 5a-5g shown in the computer network also represents an EDR endpoint onto which a data collector (or "sensor") 6a-6h has been installed. Data collectors may also be installed on any other element of the computer network, such as on the gateway or other interface. A data collector 4a has been installed on the gateway 4 in FIG. 1. The data collectors, 6a-6h, 4a collect various types of data at the nodes 5a-5h or gateway 4 including, for example, program or file hashes, files stored at the nodes 5a-5h, logs of network traffic, process logs, binaries or files carved from memory (e.g. DLL, EXE, or memory forensics artefacts), and/or logs from monitoring actions executed by programs or scripts running on the nodes 5a-5h or gateway 4 (e.g. tcp dumps).

It is envisaged that any type of data which can assist in detecting and monitoring a security threat, such as malware, security breach or intrusion into the system, may be collected by the data collectors 6a-6h, 4a during their lifecycle and that the types of data which are observed and collected may be set according to rules defined by the EDR system provider upon installation of the EDR system or in response to instructions from the EDR backend 2. For example, the data collectors 6a-6h, 4a may collect data about the behaviour of programs running on an EDR endpoint and can observe when new programs are started. Where suitable resources are available, the collected data may be stored permanently or temporarily by the data collectors 6a-6h, 4a at their respective nodes or at a suitable storage location on the first computer network 1 (not shown). The data collectors 6a-6h, 4a may also perform preliminary processing steps on the collected data limited by the computing and network resources available at each node 5a-5h or gateway 4.

The data collectors 6a-6h, 4a are set up such that they may send information such as the data they have collected or send and receive instructions to/from the EDR backend 2 through the cloud 3. This allows the EDR system provider to remotely manage the EDR system without having to maintain a constant human presence at the organisation which administers the first computer network 1.

In an embodiment, the data collectors 6a-6h may also be configured to implement an internal swarm intelligence network that comprises data collector modules of the plurality of interconnected network nodes 5a-5h of the computer network 1. As the modules 6a-6h collect data related to the respective network node 5a-5h, they may be further configured to share information that is based on the collected data in the established internal swarm intelligence network. The swarm intelligence network may be comprised of multiple semi-independent security nodes (security agent modules) which are capable of functioning on their own as well. Thus, the numbers of instances in a swarm may well vary. There may also be more than one connected swarms in one local computer network, which collaborate with one another.

The modules 6a-6h, 4a may be further configured to use the collected data and information received from the internal swarm intelligence network for generating and adapting models related to the respective network nodes 5a-5h. For example, in case a known security threat is detected, the modules 6a-6h, 4a may be configured to generate and send a security alert to the internal swarm intelligence network and to a local centre node (not shown) in the local computer network and to activate security measures for responding to the detected security threat. Further, in case an anomaly that is estimated very likely to be a new threat is identified, the module 6a-6h, 4a may be configured to verify and contain the threat, generate a new threat model on the basis of the collected data and received information and share the generated new threat model in the internal swarm intelligence network and the local centre node.

Figure 2:
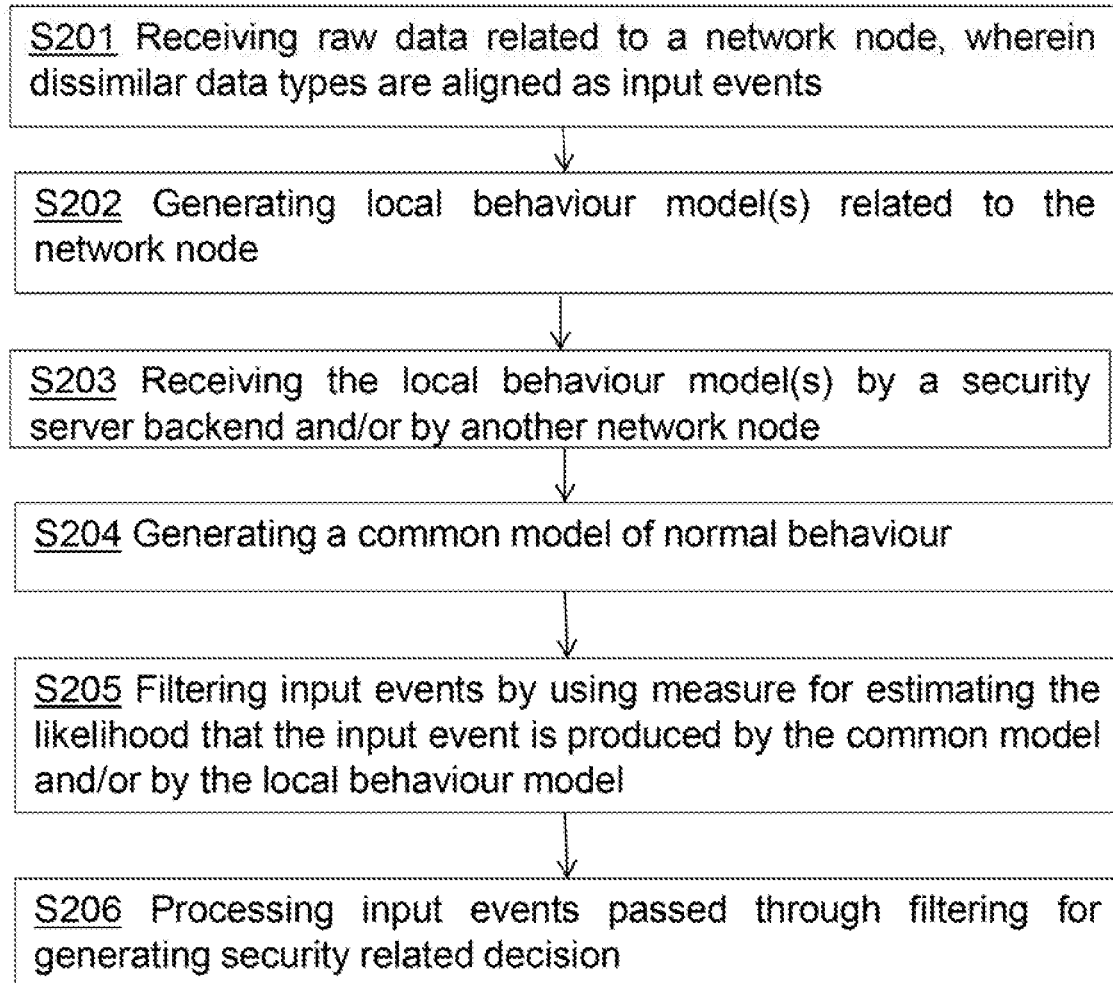
FIG. 2 is a flow diagram illustrating a method according to an embodiment.

FIG. 2 is a flow diagram illustrating a method according to an embodiment.

In S201, raw data related to a network node is received. The raw data may be received/collected and aligned from plurality of network nodes (5a-5h), wherein dissimilar data types are aligned as input events. The raw submission processing components are responsible for an initial preprocessing of all data submission that are received from various kinds of endpoint sensors. The purpose of this is to make all dissimilar data types aligned such that the next level components of the data processing pipeline are able to interpret/deal with the data blocks (further referred to as events).

The raw data related to each network node may be collected by a security server backend, from a plurality of network nodes of a computer network or by a network node of a computer network. The observed events related to the network node are effectively something measurable that are caused by multitude of underlying processes/actors. Such actors can be actual users or the operating system, for example.

In S202, one or more local behaviour models related to the network node are generated on the basis of the received input events. The local behaviour model characterizes normal behaviour related to the respective network node and the local behaviour models related to the network node are generated by each network node locally. In S203, the generated one or more local behaviour models related to each network node may be shared with one or more other network nodes of the computer network/swarm intelligence network and/or with a security server backend of the computer network.

Most underlying processes/actors related to the observed events have some normal behaviour which can be modelled with a sufficiently capable model. In an embodiment, such behaviours may at least in part be shared between hosts and in part local, but also local behaviours share commonalities even if they are not exactly the same. For example all same versions of an operating system exhibit similar background behaviour, however, every developer has slightly different practices but tend to use some similar tools and flows. That means that similarity between the background behaviours can be detected among them but instances differ.

In an embodiment, the normal behaviour modelling is aimed at via generative model(s). One or more such models may be generated relating to each network node depending on the complexity and the models can take very different forms, for example RNN (Recurrent Neural Network) such as a LSTM (Long Short-Term Memory), but many other models are also feasible.

In S204, at least one common model of normal behaviour is generated on the basis of the local behaviour models related to multiple network nodes. The common model of normal behaviour may be generated by the security server backend of the computer network and/or by any network node.

In an embodiment, the local behaviour models related to multiple network nodes are utilized to understand the behaviour of individual network nodes and information across multiple hosts is utilized to build the common model(s) of normal behaviour and then these common learnings are redistributed to cope for example operating system updates or new chrome versions which may be global but changing and would otherwise cause problems for such models (that are utilizing distributed/federated learning approaches).

In an embodiment, in case the at least one common model of normal behaviour is generated by a network node of the computer network, the process may comprise at least part of the network nodes co-operating and aiming to learn common behaviours related to those network nodes. This kind of implementation would be feasible, for example, when a same user controls multiple different computers and/or inside a same organization.

In S205, one or more of the input events are filtered by using a measure for estimating the likelihood that the input event is produced by the generated common model of normal behaviour and/or by the generated one or more local behaviour models. Only input events having a likelihood below a threshold, that may be predetermined or adaptive, of being produced by any one of the models (the common model of normal behaviour and the one or more local behaviour models) are passed through the filtering. A suitable generative model can also take into account the volumes of events and/or statistics can be collected to ensure model retraining is possible.

Thus, after the at least one generative common model (or set of models) of normal behaviour has been constructed, it can be utilized to compare what is observed on a network node/sensor with what would be expected to be observed (i.e. what the model produces). To do the comparison, a probabilistic measure may be established that is used to estimate the likelihood that this event is produced by the model. If this is very unlikely, it may be determined that the event is anomalous and appropriate further actions may be taken to protect the computer network. However, instead of an obvious use case of anomaly detection where every such anomaly is expected to have a meaning, it is here rather considered to be a form of highly effective data reduction. By sharing the generated common model of normal behaviour, all events that happen normally can be described in only one large "event" which contains model parameters to describe the normal behaviour. This can also be implemented in a privacy preserving way as the model contains none of the actual events.

In an embodiment, only the events that are different from what can be reproduced by the model(s) are needed to be shared for further processing. Thus, a radical data reduction is achieved while still maintaining full capabilities for anomaly/threat detection in the backend as every event that was not expected to be produced by the model(s) are seen (passed through filtering). This in turn enables detecting new type of attacks effectively.

In an embodiment, the filtering of the one or more of the input events may further be based on one or more of: a self-learning rule set, a decision tree, a deep learning neural network or another machine learning model. The filtering of the input events may be executed by a security server backend and/or by a network node of a computer network.

In S206, the input events passed through filtering are processed for generating a security related decision. The process may comprise an event enrichment process. Also other processes, such as aggregation, may be used when preparing the data for generating the security related decision.

Processing the input events passed through filtering for generating the security related decision may comprise using any rules, heuristics, machine learning models, fuzzy logic based models, statistical inference based models etc. to analyse the facts and to find appropriate decisions and recommendations (detections) that positively impact state of the protected IT infrastructures in real time.

If, based on the results from the events analysis component, a security threat is detected, further actions may be taken such as taking immediate action by changing the settings of the network node(s) in order to ensure an attacker is stopped and any traces of their moves is not destroyed. Changing the settings may include, for example, one or more nodes (which may be computers or other devices) being prevented from being switched off in order to preserve information in RAM, a firewall may be switched on at one or more nodes to cut off the attacker immediately, network connectivity of one or more of the network nodes may be slowed down or blocked, suspicious files may be removed or placed into quarantine, logs may be collected from network nodes, sets of command may be executed on network nodes, users of the one or more nodes may be warned that a breach has been detected and that their workstation is under investigation, and/or a system update or software patch may be sent from the EDR backend 2 to the nodes in response to detecting a security threat. It is envisaged that one or more of these actions may be initiated automatically by the above-described algorithms. For example, using the above described methods, data has been collected and sent from the nodes in the computer network 1 to the EDR backend 2. The analysis algorithm has determined that a security threat was detected. As soon as the algorithm makes the determination that a security threat was detected, it may generate and issue a command to the related network nodes without human intervention to automatically initiate one or more of the above-described actions at the nodes. By doing this, a threat can be stopped and/or the damage minimised automatically at very high speeds and without human intervention.

Generally, the proposed approach introduces number of improvements to conventional EDR backend data processing pipeline schemes. Such improvements comprise, for example, improved filtering component that filters out a very significant part of common events and/or wipes out unnecessary parts of events that do not need to be passed to the next elements of the pipeline.

Generally, as described above, the invention aims to overcome one of the critical problems of reducing the amount of data processed with minimal compromise to the detection accuracy for known or unknown threats. The embodiments of the invention provide a flexible, adaptive data selection approach that is driven fully by an analysis engine that is able to take advantage of machine learning, statistics, heuristics and any other decisional mechanisms. The embodiments of the invention also enable a flexible filtering of events together with the associated definition of filtering logic. The embodiments of the invention provide an integrated data processing pipeline with capabilities for both effective detection and data reduction.

The embodiments of the invention enable reducing costs due to data processing without significant risk to detection capabilities in EDR systems, for example. In order to build a sustainable security system without risking data collection, both costs and effectiveness are required to be in balance. An embodiment of the invention is based on a realization that you can use a generative model for data reduction. This requires also that the generated behaviour models can be trusted to actually be a valid representation of the normal behaviour and when the models are learned locally, then they can be transmitted upstream to the backend for teaching the backend what is needed from the normal behaviour. Only events that are determined to be "interesting" enough (based on using the models) require further processing by the backend for example.

Prior art solutions have typically only used mostly backend trained models for anomaly detection, that is, for doing alerts based on unexpected behaviour. Further, standard approaches to data reduction tend to be focused trying to either drop "known not malicious" events or trying to model detections to pass only events that are expected to generate detections (removing events that are not needed or processing only events that are known to be needed). However, both of those approached fail to address the problem with a situation where it is not known what is needed. Event data may include something that could help detect new attacks, for example, and the standard workaround is to sample the entire data stream.

The solution of the present invention is an entirely new way of modifying a technology normally used for anomaly detection to be a data reduction filter which only works when the generative common model is shared as a representation of the normal behaviour. The present invention enables an improved data-efficient threat detection method by modelling normal data via generative models and only sending events that cannot be predicted by the models as those events can be considered unique enough to be of interest. Data-efficiency here refers to the efficiency of one or more processes that are applied to the threat detection without requiring large quantities of data and while achieving good results.

With using the approach according to an embodiment, instead of filtering out events that are known to be clean or trying to send events known to be malicious, the process is modelled in a way that an underlying machine learning model learns what is normal. The model is shared and the statistics of the data may be replicated on the backend, for example. Finally only events that deviate significantly from what is expected (have been modelled) are sent for processing. In practise, this solution may provide significantly more data reduction that any other known solution while still keeping the possibility to creating entirely new detections on the backend feasible because the unexpected events (and only unexpected events) are sent to the backend while at the same time we are not dependent on what is known to be malicious or causing detections. The anomaly-based approach also enables sending back anything that "could be interesting" and implementing tuneable parameters for the volume of how much is sent back as there will inherently be a calculation of similarity or likelihood of the observed data being from the modelled distribution.

An embodiment of the invention provides generative models for controlling how much data is allowed through thus enabling keeping the process costs and resource usage reasonable and also optimizing finding the most relevant data to process automatically.

Machine learning may here be utilized for estimating the normal behaviour of the system, including rules and other machine learning models. The nature of the model used by the EDR system may be, or may incorporate elements, from one or more of the following: a neural network trained using a training data set, exact or heuristic rules (e.g. hardcoded logic), fuzzy logic based modelling, and statistical inference-based modelling. The model may be defined to take into account particular patterns, files, processes, connections, and dependencies between processes.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of data-efficient threat detection in a computer network, the method comprising:
    receiving raw data related to a network node, wherein dissimilar data types are aligned as input events;
    generating one or more local behaviour models related to the network node on the basis of the received input events, wherein the local behaviour model characterizes normal behaviour related to the network node;
    sharing the generated one or more local behaviour models related to the network node with one or more peer network nodes of the computer network;
    generating at least one common model of normal behaviour on the basis of local behaviour models related to multiple network nodes;
    filtering one or more of the input events by using a measure for estimating the likelihood that the input event is produced by the generated common model of normal behaviour and/or by the generated one or more local behaviour models, wherein only input events having a likelihood below a predetermined threshold of being produced by any one of the models are passed through the filtering; and
    processing input events passed through the filtering for generating a security related decision.

2. The method according to claim 1, wherein the one or more local behaviour models related to the network node are generated by the network node and the at least one common model of normal behaviour is generated by a security server backend of the computer network and/or by the network node.

3. The method according to claim 1, further comprising utilizing local behaviour models related to multiple network nodes to understand the behaviour of individual network nodes.

4. The method according to claim 1, wherein the filtering of the one or more of the input events is further based on one or more of: a self-learning rule set, a decision tree, a deep learning neural network or another machine learning model.

5. The method according to claim 1, wherein the raw data is received, by a security server backend, from a plurality of network nodes of a computer network or by a network node of a computer network.

6. The method according to claim 1, wherein the filtering of the input events is executed by a security server backend and/or by a network node of a computer network.

7. The method according to claim 1, wherein said processing input events comprises using at least one of the following processes for generating the security related decision: predetermined rules, heuristics, machine learning models, fuzzy logic based models, statistical inference based model.

8. The method according to claim 1, further comprising: taking further action to secure the computer network and/or any related network node, wherein the further action comprises any one or more of:
    preventing one or more of the network nodes from being switched off;
    switching on a firewall at one or more of the network nodes;
    slowing down or blocking network connectivity of one or more of the network nodes;
    removing or placing into quarantine suspicious files;
    collecting logs from network nodes;
    executing sets of command on network nodes;
    warning a user of one or more of the network nodes that signs of a security breach have been detected; and/or
    sending a software update to one or more of the network nodes.

9. The method according to claim 1, further comprising sharing the generated one or more local behaviour models related to the network node with a security server backend of the computer network.

10. A method of data-efficient threat detection in a computer network, the method comprising at a network node of the computer network:
    receiving raw data related to the network node, wherein dissimilar data types are aligned as input events;

generating one or more local behaviour models related to the network node on the basis of the received input events, wherein the local behaviour model characterizes normal behaviour related to the network node; and sharing data related to the generated one or more local behaviour models with one or more peer network nodes for enabling generation of at least one common model of normal behaviour on the basis of local behaviour models received from multiple network nodes and for enabling filtering one or more of the input events by using a measure for estimating the likelihood that the input event is produced by the generated common model of normal behaviour or by the generated one or more local behaviour models, wherein only input events having a likelihood below a predetermined threshold of being produced by any one of the models are passed through the filtering and for enabling processing input event passed through the filtering for generating a security related decision.

11. The method according to claim 10, further comprising receiving the generated at least one common model of normal behaviour from the security server backend or another network node of the computer network.

12. The method according to claim 10, further comprising receiving data related to one or more local behaviour models related to one or more other network nodes of the computer network and generating the at least one common model of normal behaviour on the basis of the received local behaviour models.

13. The method according to claim 10, further comprising sharing the data related to the generated one or more local behaviour models with a security server backend for enabling generation of at least one common model of normal behaviour on the basis of local behaviour models received from multiple network nodes and for enabling filtering one or more of the input events by using a measure for estimating the likelihood that the input event is produced by the generated common model of normal behaviour or by the generated one or more local behaviour models, wherein only input events having a likelihood below a predetermined threshold of being produced by any one of the models are passed through the filtering and for enabling processing input event passed through the filtering for generating a security related decision.

14. A method of data-efficient threat detection, the method comprising at a security server backend of a computer network:

receiving one or more local behaviour models related to multiple network nodes, wherein each behaviour model characterizes normal behaviour related to the respective network node;

generating at least one common model of normal behaviour on the basis of the generated local behaviour models related to the multiple network nodes for enabling filtering one or more of input events by using a measure for estimating the likelihood that the input event is produced by the generated common model of normal behaviour or by the received one or more local behaviour models, wherein only input events having a likelihood below a predetermined threshold of being produced by the common model of normal behaviour are passed through the filtering;

sharing the generated at least one common model of normal behaviour with one or more peer network nodes of the computer network for enabling the filtering of the input events at the network nodes; and processing input events passed through the filtering for generating a security related decision.

15. The method according to claim 14, further comprising receiving input events related to one or more network nodes passed through the filtering from one or more network nodes.

16. The method according to claim 14, further comprising receiving input events that have passed through filtering by using a measure for estimating the likelihood that the input event is produced by the generated one or more local behaviour models from the one or more network nodes and filtering the received input events from the network nodes by using the generated at least one common model of normal behaviour.

17. An apparatus in a computer network system comprising:

at least one computing device comprising a memory and one or more processors, the one or more processors configured to:

receive raw data related to a network node, wherein dissimilar data types are aligned as input events;

generate one or more local behaviour models related to the network node on the basis of the received input events, wherein the local behaviour model characterizes normal behaviour related to the network node;

generate at least one common model of normal behaviour on the basis of local behaviour models related to multiple network nodes;

share the generated one or more local behaviour models related to the network node with one or more peer network nodes of the computer;

filter one or more of the input events by using a measure for estimating the likelihood that the input event is produced by the generated common model of normal behaviour and/or by the generated one or more local behaviour models, wherein only input events having a likelihood below a predetermined threshold of being produced by any one of the models are passed through the filtering; and process input events passed through the filtering for generating a security related decision.

18. The apparatus according to claim 17, wherein the one or more local behaviour models related to the network node are generated by the network node and the at least one common model of normal behaviour is generated by a security server backend of the computer network and/or by the network node.

19. The apparatus according to claim 17, the processor being further configured to utilize local behaviour models related to multiple network nodes to understand the behaviour of individual network nodes.

20. The apparatus according to claim 17, wherein the filtering of the one or more of the input events is further based on one or more of: a self-learning rule set, a decision tree, a deep learning neural network or another machine learning model.

21. The apparatus according to claim 17, wherein the raw data is received, by a security server backend, from a plurality of network nodes of a computer network or by a network node of a computer network.

22. The apparatus according to claim 17, wherein the filtering of the input events is executed by a security server backend and/or by a network node of a computer network.

23. The apparatus according to claim 17, wherein the one or more local behaviour models related to the network node are further shared with a security server backend of the computer network.

24. A non-transitory computer readable medium comprising a computer program which, when run on a computer system or server, causes the computer system or server to act as the at least one computing device according to claim 17.

25. The non-transitory computer readable medium of claim 24, wherein the computer program is stored on the non-transitory computer readable medium.

\* \* \* \* \*